(12) United States Patent
Yao (10) Patent No.: US 7,317,906 B2
(45) Date of Patent: Jan. 8, 2008

(54) AM RADIO RECEIVER

(75) Inventor: Yasuhisa Yao, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 11/069,076

(22) Filed: Mar. 1, 2005

(65) Prior Publication Data

US 2005/0221782 A1    Oct. 6, 2005

(30) Foreign Application Priority Data

Mar. 8, 2004   (JP)   ............................. 2004-063544

(51) Int. Cl.
*H04B 1/10* (2006.01)
*H04B 1/16* (2006.01)

(52) U.S. Cl. .................. 455/296; 455/222; 455/297; 455/334

(58) Field of Classification Search ................ 455/296, 455/334, 297, 310–312, 295, 306–307, 308–309, 455/77, 130, 152.1, 222–223, 278.1, 283–284, 455/277.2, 133–135, 63.1, 67.11, 67.13; 381/71.8, 71.11, 71.12, 71.14, 71.5, 94.1, 381/94.9, 71.6
See application file for complete search history.

(56) References Cited

U.S. PATENT DOCUMENTS

| | | | |
|---|---|---|---|
| 4,856,084 A | | 8/1989 | Richards, Jr. |
| 4,977,615 A | * | 12/1990 | Suzuki et al. ............. 455/277.2 |
| 5,586,180 A | * | 12/1996 | Degenhardt et al. ... 379/388.04 |
| 6,041,126 A | * | 3/2000 | Terai et al. ................ 381/71.6 |
| 6,064,865 A | * | 5/2000 | Kuo et al. .................. 455/135 |
| 6,236,844 B1 | * | 5/2001 | Cvetkovic et al. .......... 455/273 |
| 6,385,261 B1 | * | 5/2002 | Tsuji et al. ................. 375/346 |
| 6,418,228 B1 | * | 7/2002 | Terai et al. ................ 381/71.8 |
| 2006/0135112 A1 | * | 6/2006 | Matsumoto ................ 455/334 |
| 2006/0274866 A1 | * | 12/2006 | Chang ........................ 375/346 |
| 2007/0049227 A1 | * | 3/2007 | Su .............................. 455/223 |

* cited by examiner

*Primary Examiner*—Pablo N. Tran
(74) *Attorney, Agent, or Firm*—Hamre, Schumann, Mueller & Larson, P.C.

(57) ABSTRACT

An AM radio receiver comprises an RF amplifier, a first mixer that converts the RF signal to a first intermediate-frequency signal, a first bandpass filter that band-limits the first intermediate-frequency signal, a second mixer that converts the output from the first bandpass filter to a second intermediate-frequency signal, a second bandpass filter that band-limits the second intermediate-frequency signal, an intermediate-frequency amplifier that amplifies the output from the second bandpass filter, an AM detector that demodulates the output from the intermediate-frequency amplifier and provides output of an audio signal, and a noise detector for detecting and eliminating ambient noise. The noise detector comprises a first noise detector that detects noise from the RF signal and eliminates the noise contained in the first intermediate-frequency signal, and a second noise detector that detects noise from the second intermediate-frequency signal and eliminates that noise. The AM radio receiver further comprises a halting device that halts the second noise detector for a predetermined period of time when the first noise detector has detected noise. Thus, distortion of the audio signal caused by redundant noise elimination operations is avoided and noise contained in the second intermediate-frequency signal can be detected and eliminated appropriately.

6 Claims, 10 Drawing Sheets

AM RADIO RECEIVER

BACKGROUND OF THE INVENTION

1. Field of the Invention

The present invention relates to an AM radio receiver provided with functions for detecting and eliminating noise superimposed on a received radio station signal.

2. Description of the Related Art

Noises such as pulse noise in an AM radio receiver are caused mainly by ambient electrical and mechanical disturbances entering the radio station signal from the antenna, and in an AM radio receiver that employs an envelope detection, any superimposed disturbance pulses are detected as audio, causing an annoying sound quality.

In automobile AM radios in particular, ignition noise generated from the engine's spark plugs and other disturbances generated by the mechanical operation of other electrical systems are superimposed from the antenna, remarkably affecting the audio.

An example of an AM radio receiver that has functions for detecting and eliminating ambient noise is described in U.S. Pat. No. 4,856,084. Such a conventional AM radio receiver will be described hereinafter with reference to FIG. 9.

Figure 9:
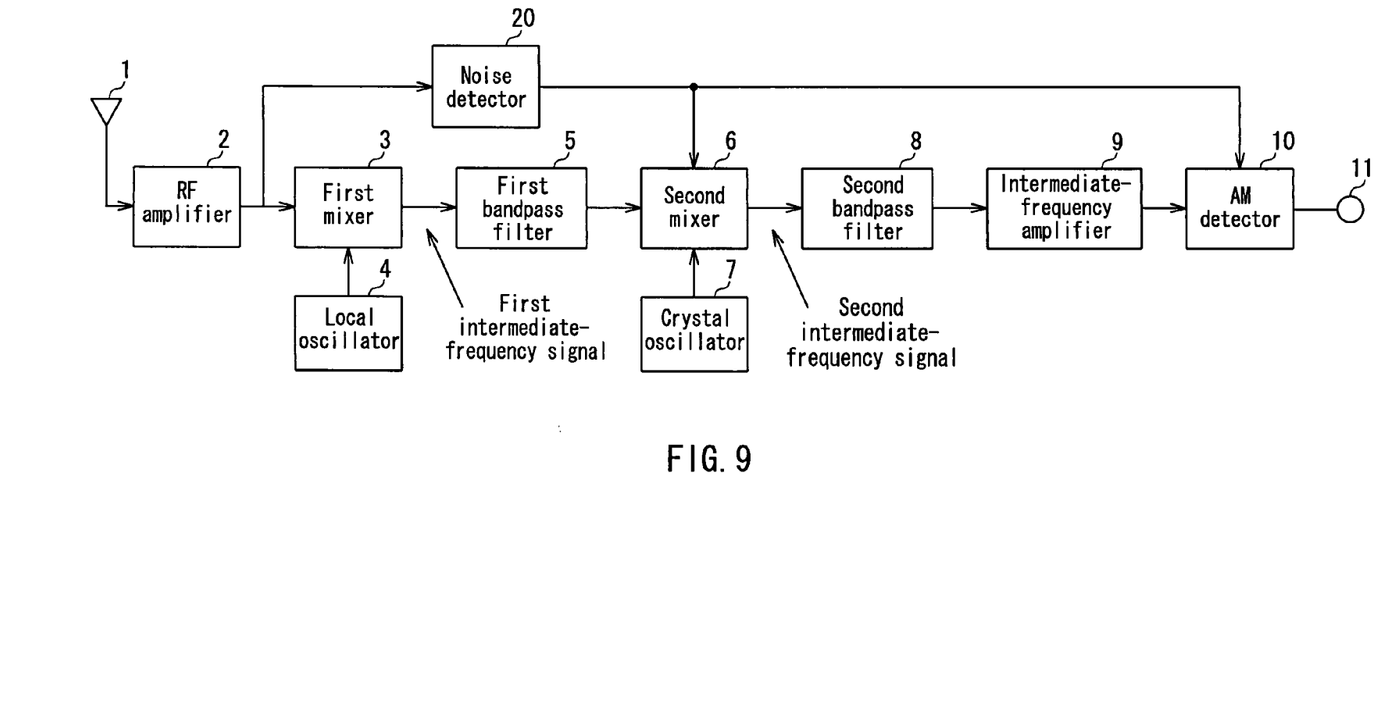
FIG. 9 is a block diagram showing the configuration of a conventional AM radio receiver.

This AM radio receiver is composed of an antenna 1, a RF amplifier 2, a first mixer 3, a local oscillator 4, a first bandpass filter 5, a second mixer 6, a crystal oscillator 7, a second bandpass filter 8, an intermediate-frequency amplifier 9, an AM detector 10, an AM detector output terminal 11 and a noise detector 20. The operation of this AM radio receiver is as follows.

In FIG. 9, a radio station signal received by antenna 1 is amplified by the RF amplifier 2, and mixed in the first mixer 3 with a local oscillation signal from the local oscillator 4 so as to be converted to a first intermediate-frequency signal. The first intermediate-frequency signal is band-limited by the first bandpass filter 5, and mixed in the second mixer 6 with a crystal oscillation signal from the crystal oscillator 7 so as to be converted to a second intermediate-frequency signal. The second intermediate-frequency signal is band-limited by the second bandpass filter 8, amplified by the intermediate-frequency amplifier 9, AM-demodulated in the AM detector 10 and output from the output terminal 11.

On the other hand, the noise detector 20 detects noise superimposed at the antenna 1 from the output signal of the RF amplifier 2, and upon detection of noise, generates a blanking pulse for a certain period of time. During the period in which this blanking pulse is generated, the second mixer 6 and AM detector 10 are halted. During the period in which the second mixer 6 and AM detector 10 are halted, no noise is present in the radio station signal, so that the annoying sound is eliminated and the sound quality is improved.

However, with the conventional AM radio receiver constituted as shown in FIG. 9, since a single noise detector 20 halts both the second mixer 6 and the AM detector 10 for a certain period of time, a redundant operation is caused in such a manner that the AM detector 10 is halted even though the noise is eliminated by the second mixer 6. As a result, there is a problem that demodulation cannot be done with good sound quality as described below.

Figure 10:
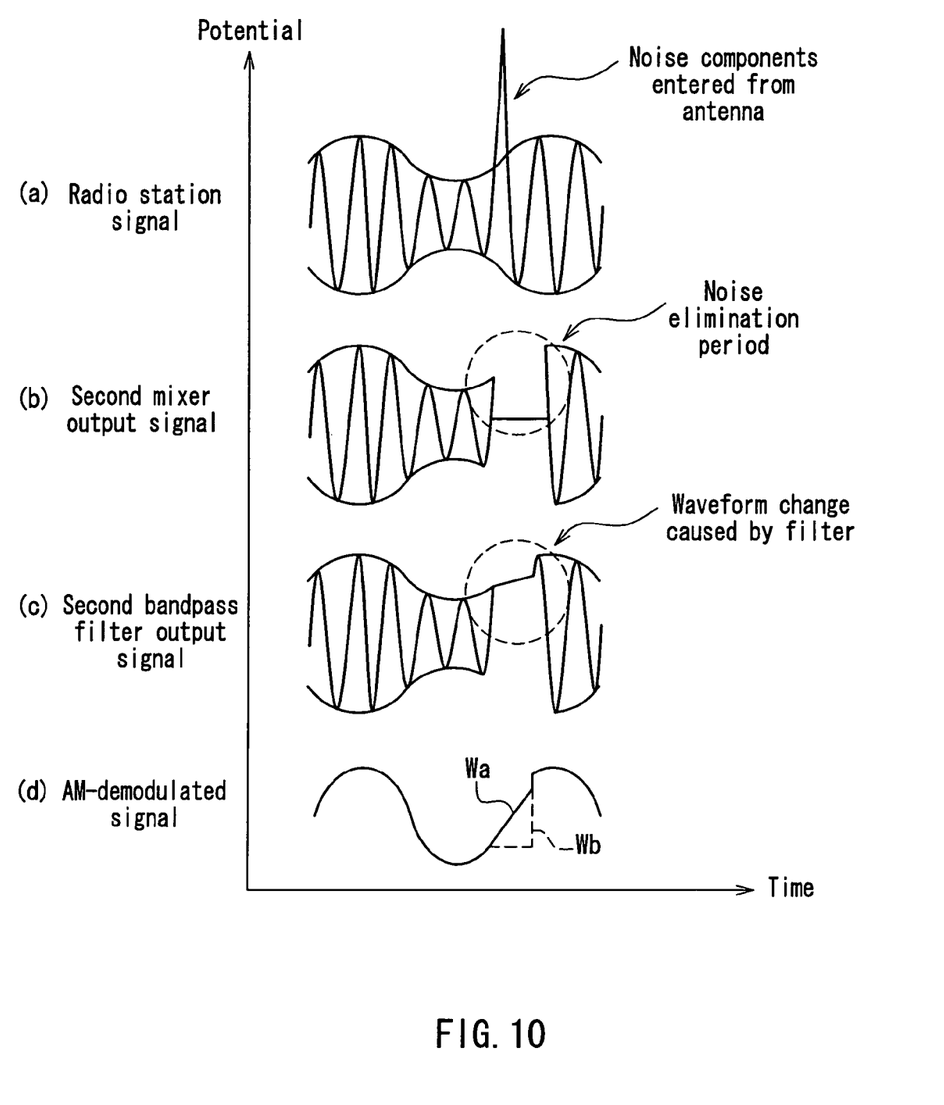
FIG. 10 illustrates the relationships among the radio station signal with noise superimposed, the second mixer output signal, the second bandpass filter output signal and the AM-demodulated signal.

FIG. 10 illustrates the relationships among the radio station signal (a), the second mixer output signal (b), the second bandpass filter output signal (c), and the AM-demodulated signal (d), when both the second mixer 6 and the AM detector 10 are halted by a single noise detector 20 for a certain period of time. In the figure, the horizontal axis represents time and the vertical axis represents the potential. Noise components entering from the antenna are superimposed on the radio station signal (a).

During the noise elimination period in which noise is eliminated by the blanking pulse from the noise detector 20, no signal is output from the second mixer output signal (b). However, a waveform change occurs in the second bandpass filter output (c) due to the wave filter effect of the second bandpass filter 8, so that even if demodulation is performed by the AM detector 10 in this state, the AM-demodulated signal (d) has its waveform improved as indicated by the solid line Wa, and the sound quality deterioration is also improved.

However, when the AM detector 10 is also halted at the same time, a period of no signal output occurs in the AM-demodulated signal (d), and so the waveform is distorted as indicated by the dashed line Wb, so that the sound quality deteriorates.

SUMMARY OF THE INVENTION

It is thus an object of the present invention to solve the problems with the conventional example described above and provide an AM radio receiver wherein the redundant operation of temporarily halting the AM detector at the same time as the second mixer by a single noise detector is avoided, and the grating sound can be eliminated and the sound quality can be improved by performing appropriate noise elimination.

The AM radio receiver according to the present invention comprises: an RF amplifier that amplifies a received radio station signal, a first mixer that mixes the RF signal output from the RF amplifier with a local oscillation signal from a local oscillator, thus converting it to a first intermediate-frequency signal, a first bandpass filter that band-limits the first intermediate-frequency signal, a second mixer that mixes the output signal from the first bandpass filter with a crystal oscillation signal from a crystal oscillator, thus converting it to a second intermediate-frequency signal, a second bandpass filter that band-limits the second intermediate-frequency signal, an intermediate-frequency amplifier that amplifies the output signal from the second bandpass filter, an AM detector that AM-demodulates the output signal from the intermediate-frequency amplifier and provides output of an audio signal, and a noise detector for detecting and eliminating ambient noise present in the received radio station signal.

In order to solve the problem described above, in an AM radio receiver as a first aspect of the present invention, the noise detector comprises a first noise detector that detects noise from the RF signal and eliminates noise contained in the first intermediate-frequency signal, and a second noise detector that detects noise from the second intermediate-frequency signal and eliminates noise contained in the second intermediate-frequency signal. The AM radio receiver further comprises a halting device that halts the second noise detector for a predetermined period of time when the first noise detector has detected noise.

In an AM radio receiver as a second aspect of the present invention, the noise detector comprises a first noise detector that detects noise from the RF signal and eliminates noise contained in the first intermediate-frequency signal, and a second noise detector that detects noise from the second intermediate-frequency signal and eliminates noise contained in the audio signal. The AM radio receiver further comprises a halting device that halts the second noise detector for a predetermined period of time when the first noise detector has detected noise.

DESCRIPTION OF THE PREFERRED EMBODIMENTS

With an AM radio receiver according to the present invention, by halting the second noise detector during the period in which the first noise detector detects and eliminates noise, unnecessary distortion of the output signal caused by redundant operations can be avoided. Moreover, noise contained in the second intermediate-frequency signal that was not detected by the first noise detector is detected by the second noise detector, so that by halting the intermediate-frequency amplifier for a certain period of time or by holding the AM detector output signal for a certain period of time, noise can be detected and eliminated appropriately.

An AM radio receiver as a first aspect of the present invention may have a configuration wherein, upon detecting the noise, the second noise detector provides output of a detection signal and the detection signal is supplied to the intermediate-frequency amplifier for a predetermined period of time, and the intermediate-frequency amplifier comprises a noise elimination section that eliminates noise contained in the intermediate-frequency signal depending on the detection signal.

In addition, the noise elimination section may be configured to halt the output of the intermediate-frequency amplifier during the period in which the detection signal is supplied.

An AM radio receiver as a second aspect of the present invention may have a configuration wherein, upon detecting the noise, the second noise detector provides output of a detection signal and the detection signal is supplied to the AM detector for a predetermined period of time, and the AM detector comprises a noise elimination section that eliminates noise contained in the audio signal depending on the detection signal.

In addition, the noise elimination section may be configured to cause the output signal of the AM detector to be held during the period in which the detection signal is supplied.

In the following, AM radio receivers according to embodiments of the present invention will be described in more detail, with reference to the drawings.

Embodiment 1

Figure 1:
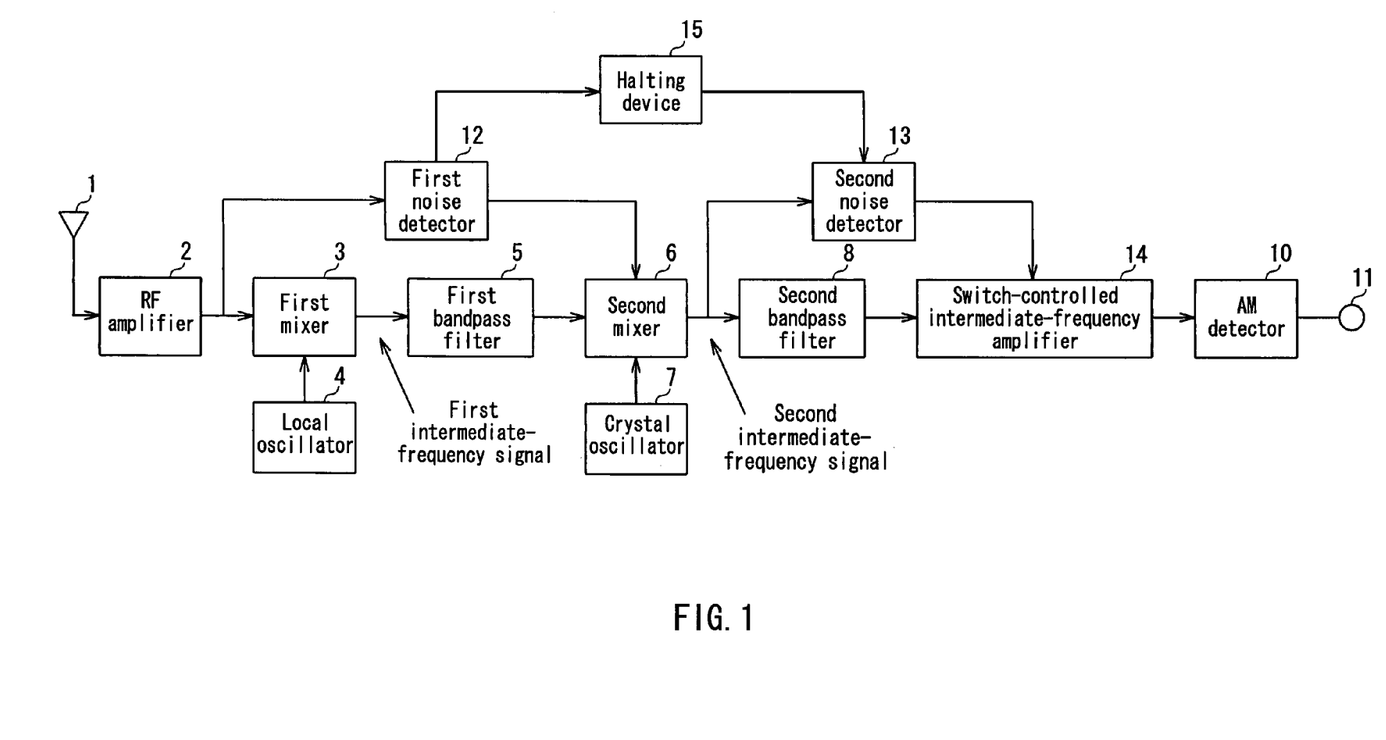
FIG. 1 is a block diagram showing an AM radio receiver according to Embodiment 1 of the present invention.

FIG. 1 is a block diagram showing the configuration of an AM radio receiver according to Embodiment 1 of the present invention. Elements that are the same as in the conventional example shown in FIG. 9 are described using the same reference symbols.

In the AM radio receiver of FIG. 1, the noise detector 20 in the configuration of the conventional example shown in FIG. 9 is replaced with a first noise detector 12, a second noise detector 13 and a halting device 15. In addition, the intermediate-frequency amplifier 9 is replaced with a switch-controlled intermediate-frequency amplifier 14. The remainder of the configuration is the same as that of the conventional example shown in FIG. 9.

The output signal of the RF amplifier 2 is supplied to the first noise detector 12, which in turn supplies its output signal to the second mixer 6 and the halting device 15. The output signal of the second mixer 6 is supplied to the second noise detector 13, which in turn supplies its output signal to the switch-controlled intermediate-frequency amplifier 14. The output signal of the halting device 15 is supplied to the second noise detector 13.

An operation of an AM radio receiver constituted as above is described in the following.

In FIG. 1, a radio station signal received by antenna 1 is amplified by the RF amplifier 2, and mixed in the first mixer 3 with a local oscillation signal from the local oscillator 4 so as to be converted to a first intermediate-frequency signal. The first intermediate-frequency signal is band-limited by the first bandpass filter 5, and mixed in the second mixer 6 with a crystal oscillation signal from the crystal oscillator 7 so as to be converted to a second intermediate-frequency signal. The second intermediate-frequency signal is band-limited by the second bandpass filter 8, amplified by the switch-controlled intermediate-frequency amplifier 14 and then AM-demodulated in the AM detector 10 to be output.

Upon detecting noise from the output signal of the RF amplifier 2, the first noise detector 12 provides output of a halt signal that halts the second mixer 6 for a certain period of time, and also supplies a noise detection signal to the halting device 15. The halting device 15 is activated by the noise detection signal supplied from the first noise detector 12, and thus halts the second noise detector 13 during the period in which the first noise detector 12 supplies the halt signal to the second mixer 6. Upon detecting noise from the output signal of the second mixer 6, the second noise detector 13 provides output of a signal that halts the switch-controlled intermediate-frequency amplifier 14 for a certain period of time.

Figure 2:
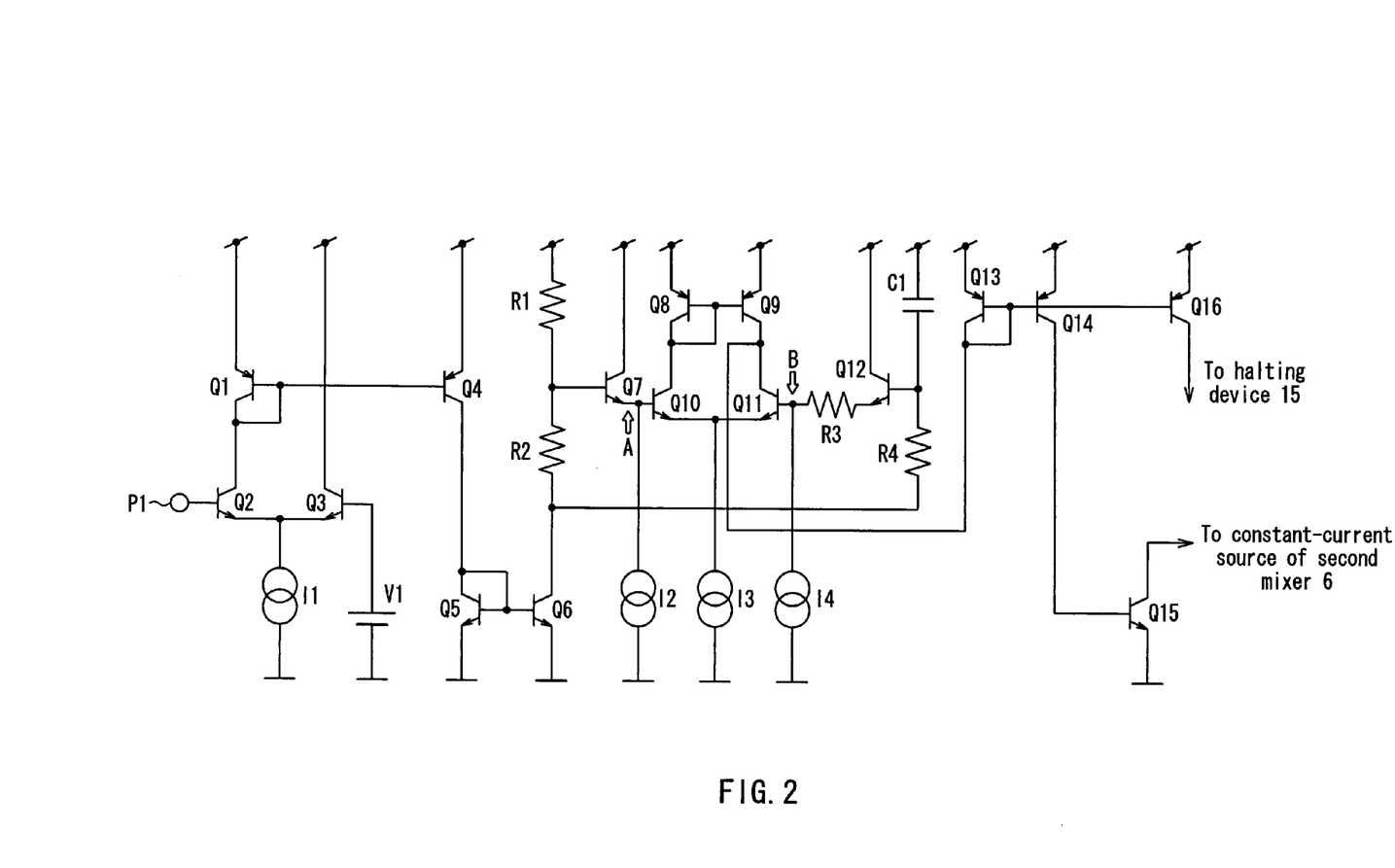
FIG. 2 is a circuit diagram showing an example of the configuration of the first noise detector in the same AM radio receiver.

FIG. 2 shows an example of the configuration of the first noise detector 12. The first noise detector 12 is composed of resistors $R_1$-$R_4$, a capacitor $Cl_1$, transistors $Q_1$-$Q_{16}$, a constant-voltage supply $V_1$ and constant-current supplies $I_1$-$I_4$.

Figure 3:
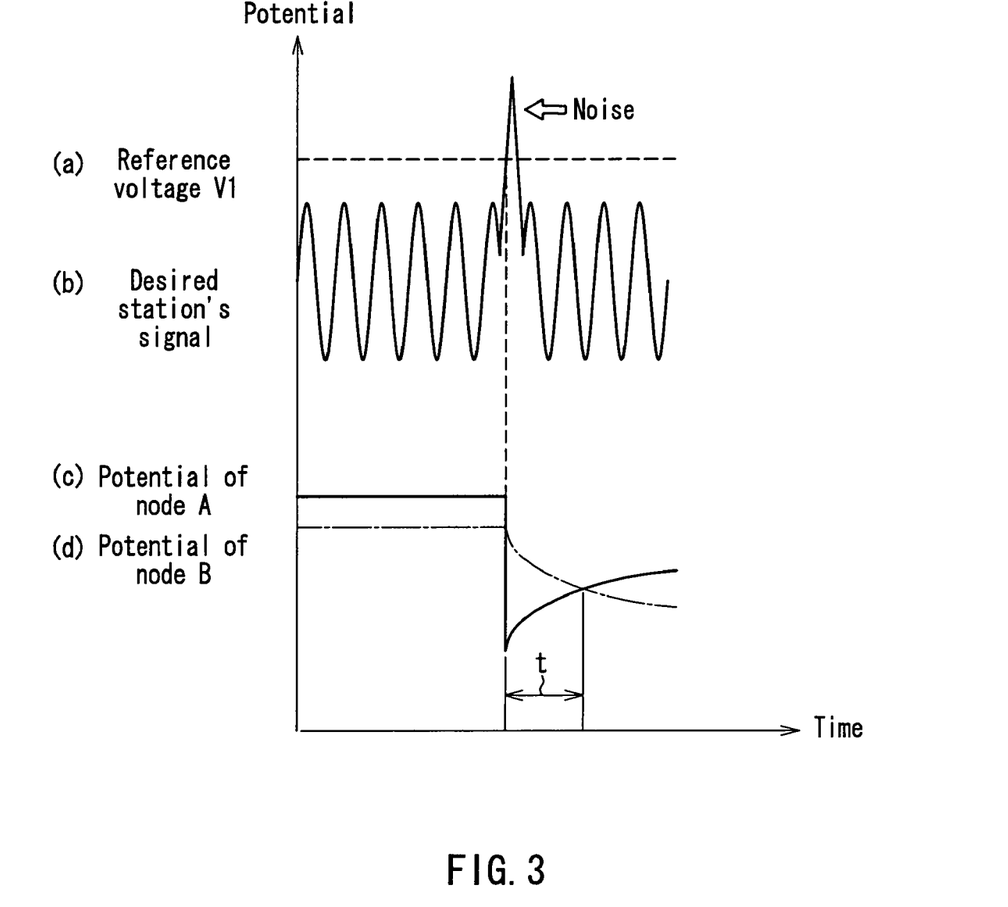
FIG. 3 is a diagram illustrating the relationship between the potentials of a node A and a node B of the first and second noise detectors in the same AM radio receiver.

In FIG. 2, the output signal of the RF amplifier 2 (see FIG. 1) is supplied to a noise detection terminal $P_1$. When noise with a potential higher than a reference voltage $V_1$ (the voltage of constant-voltage supply $V_1$) is supplied as an input to the noise detection terminal $P_1$, which is the input terminal of a comparator formed by the transistors $Q_1$, $Q_2$ and $Q_3$ and the constant-current supply $I_1$, the current of the constant-current supply $I_1$ flows to transistors $Q_1$ and $Q_2$, and thus current also flows to transistors $Q_4$, $Q_5$ and $Q_6$. The potential of a node A thus drops instantaneously, and the potential of a node B drops gradually accompanying a discharge according to a time constant determined by the capacitor $C_1$ and the resistors $R_1$, $R_2$ and $R_4$. FIG. 3 illustrates this situation. FIG. 3 illustrates the mutual relationships among the ambient noise present in the desired station's signal (b), the reference voltage $V_1$ (a), and the potentials at the nodes A and B, (c) and (d), respectively, in the first noise detector 12.

When the potential of the node A (c) drops instantaneously and the potential of the node B (d) drops gradually, the potential difference between the node A and the node B is reversed. As the potential of the node A (c) recovers gradually, the potential difference between the node A and the node B returns to its original state after a time period t.

During the time period 4 the current from the current supply $I_3$ flows to the transistors $Q_{13}$ and $Q_{14}$ of FIG. 2. Thus, the transistor $Q_{15}$ is turned ON and the transistor $Q_{16}$ assumes the state in which current can be supplied. The transistor $Q_{15}$ is connected to the second mixer 6 and when the transistor $Q_{15}$ is turned ON, the constant-current supply to the second mixer 6 is cut off and the second mixer 6 is halted for the time period t. In addition, the transistor $Q_{16}$ is connected to the halting device 15 and for the time period t during which the transistor $Q_{16}$ assumes the state in which current can be supplied, the second noise detector 13 is halted by means of the halting device 15 as described later.

Because a time lag typically occurs in the noise due to the second bandpass filter 8, or the noise itself may become elongated, the time period t during which the next-stage circuit is halted is set to be sufficiently long so as not to affect the sound quality.

Figure 4:
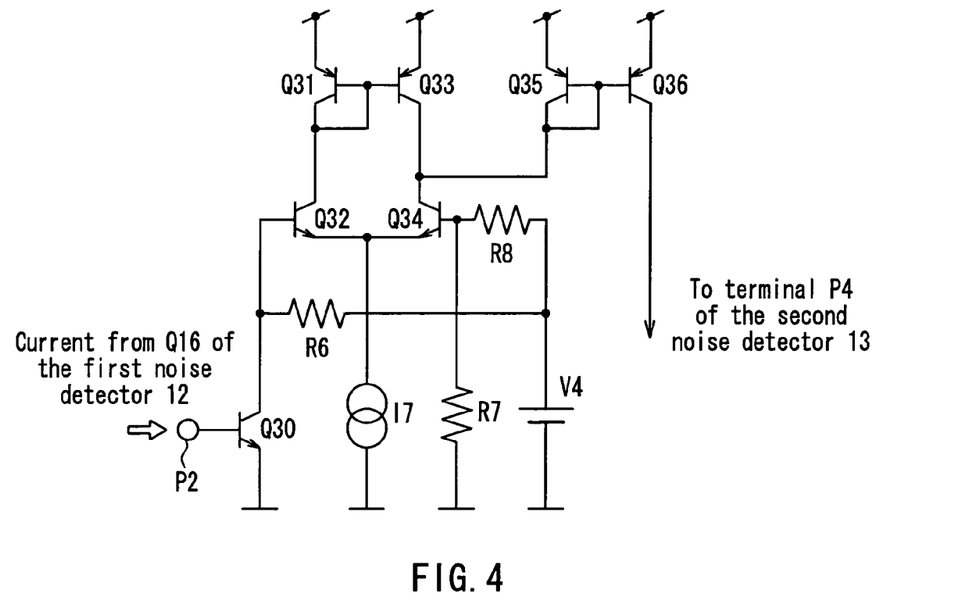
FIG. 4 is a circuit diagram showing an example of the configuration of the halting device in the same AM radio receiver.

FIG. 4 illustrates an example of the configuration of the halting device 15. This halting device 15 is composed of resistors $R_6$-$R_8$, transistors $Q_{30}$-$Q_{36}$, a constant-voltage supply $V_4$ and a constant-current supply $I_7$. The output of the transistor $Q_{16}$ of the first noise detector 12 is supplied to a terminal $P_2$.

In FIG. 4, when the current constituting a halt signal is supplied from the first noise detector 12 to the terminal $P_2$, the transistor $Q_{30}$ is turned ON. Thereby, the transistor $Q_{36}$ assumes the state in which current can be supplied. Transistor $Q_{36}$ is connected to the second noise detector 13, so that only when a halt signal is received from the first noise detector 12, the halting device 15 operates so as to cause the second noise detector 13 to be unable to detect noise.

Figure 5:
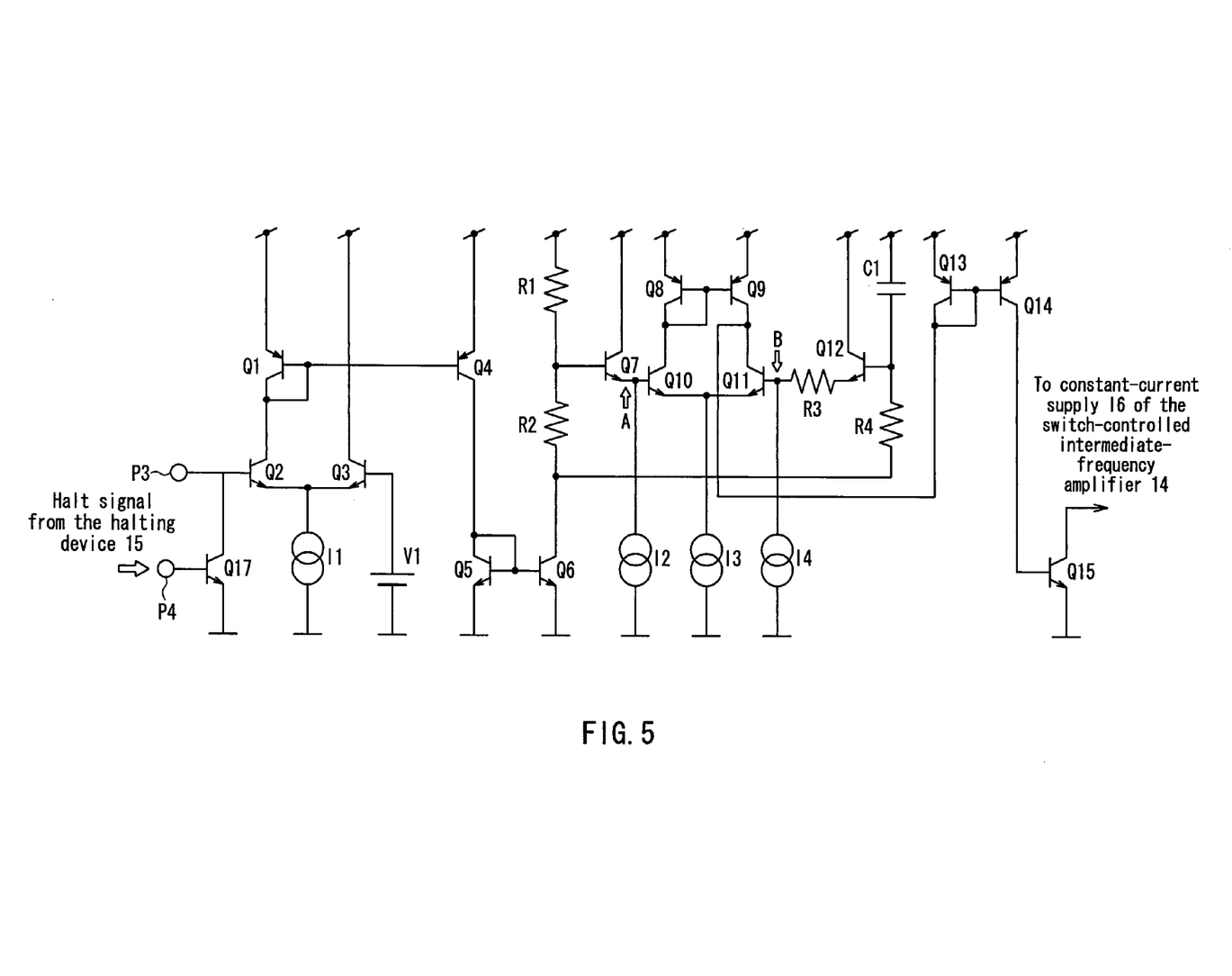
FIG. 5 is a circuit diagram showing an example of the configuration of the second noise detector in the same AM radio receiver.

FIG. 5 illustrates an example of the configuration of the second noise detector 13. The configuration of this second noise detector 13 is nearly identical to that of the first noise detector 12 shown in FIG. 2, and constituent elements that are the same as in the first noise detector 12 are described using the same reference symbols. The second noise detector 13 differs from the first noise detector 12 in that the transistor $Q_{17}$ is connected to the noise detection terminal $P_4$ and the transistor $Q_{16}$ connected to the halting device 15 is not provided.

The second intermediate-frequency signal, which is the output signal from the second mixer 6 (see FIG. 1), is supplied to noise detection terminal $P_3$. The halt signal from the halting device 15 is supplied to terminal $P_4$ connected to the base of transistor $Q_{17}$.

In the circuit of FIG. 5, when noise of a potential higher than reference voltage $V_1$ is supplied as an input to noise detection terminal $P_3$, in the same manner as in the first noise detector 12 of FIG. 2, the circuit operates as shown in FIG. 3. Thus, by cutting off the connected constant-current supply, transistor $Q_{15}$ halts the next-stage circuit. To wit, transistor $Q_{15}$ is connected to the switch-controlled intermediate-frequency amplifier 14, so that when noise is detected, the switch-controlled intermediate-frequency amplifier 14 is halted by the operation of transistor $Q_{15}$. On the other hand, when a halt signal is supplied from the halting device 15 to terminal $P_4$, transistor $Q_{17}$ is turned ON. Only when transistor $Q_{17}$ is in the ON state, does the comparator composed of the transistors $Q_1$, $Q_2$ and $Q_3$ and the constant-current supply $I_1$ not operate, so that the noise detection operation is halted.

Thus when the first noise detector 12 detects noise, the halting device 15 halts the second noise detector 13, so that the operation maintains the relationship wherein the second noise detector 13 halts the noise detection operation during the period in which the first noise detector 12 detects noise and halts the second mixer 6.

Figure 6:
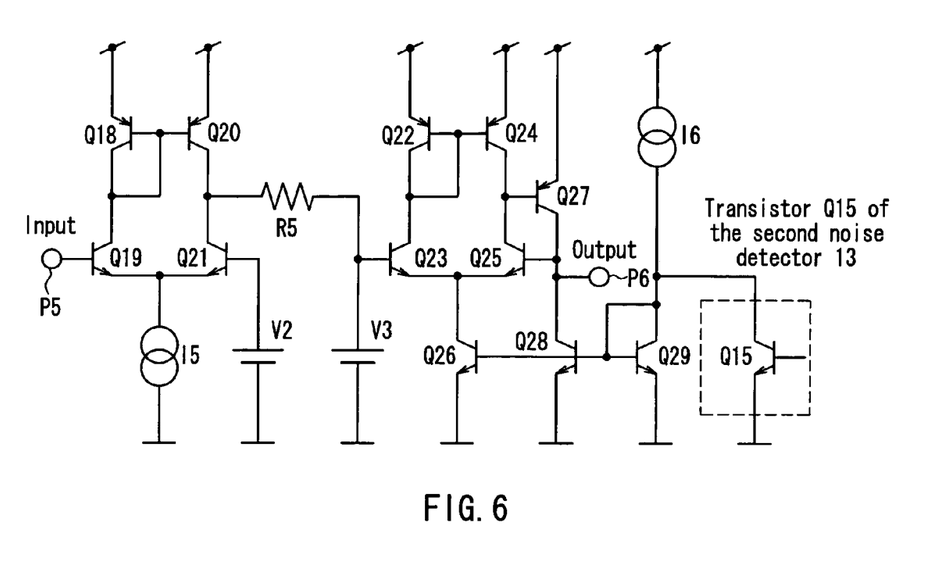
FIG. 6 is a circuit diagram showing an example of the configuration of a switch-controlled intermediate-frequency amplifier in the same AM radio receiver.

FIG. 6 illustrates an example of the configuration of the switch-controlled intermediate-frequency amplifier 14. This switch-controlled intermediate-frequency amplifier 14 is composed of a resistor $R_5$, transistors $Q_{18}$-$Q_{29}$, constant-voltage supplies $V_2$ and $V_3$ and constant-current supplies $I_5$ and $I_6$.

In FIG. 6, the signal applied to input terminal $P_5$ from the intermediate-frequency amplifier 9 (see FIG. 1) is amplified by an amplifier circuit composed of resistor $R_5$, transistors $Q_{18}$-$Q_{21}$, constant-voltage supply $V_2$ and constant-current supply $I_5$, with a gain determined by $(R_5 \cdot I_5)/V_t (\approx 26 \text{ mV})$. The amplified signal passes through a buffer circuit composed of transistors $Q_{22}$-$Q_{29}$, constant-voltage supply $V_3$ and constant-current supply $I_6$, and is supplied from output terminal $P_6$ to the AM detector 10. Transistor $Q_{15}$ of the second noise detector 13 is connected to constant-current supply $I_6$, and when transistor $Q_{15}$ is turned ON, the current supply is cut off so that the output of the intermediate-frequency signal from output terminal $P_6$ is halted. To wit, when the second noise detector 13 detects noise, transistor $Q_{15}$ is turned ON during the time period t shown in FIG. 3, so that the output from the switch-controlled intermediate-frequency amplifier 14 is halted.

The following is a more detailed description of the operation in the case that ambient noise entered from the antenna into the radio station signal in the AM radio receiver of the aforementioned configuration.

When noise superimposed on the radio station signal is detected by the first noise detector 12 from the output signal of the RF amplifier 2, the second mixer 6 is halted by an output signal from the first noise detector 12. During the period in which noise is thus eliminated, at the same time, the second noise detector 13 is halted by the halting device 15. Accordingly, the operation of eliminating noise is performed only by the first noise detector 12, and thus distortion of the AM-demodulated signal by redundant operations as in the prior art example is avoided.

On the other hand, in the case that ambient noise entering from the antenna is not detected by the first noise detector 12 due to the effect of the interfering station signal, noise will be present in the output of the second mixer 6. However, the output signal of the first mixer 3 is band-limited by the first bandpass filter 5, so that the interfering station signal will be attenuated, and thus the second noise detector 13 is capable of performing pulse noise detection appropriately without a decrease in its detection sensitivity. Accordingly, when ambient noise is present, the second noise detector 13 provides output of a detection signal and thus the switch-controlled intermediate-frequency amplifier 14 is halted for a certain period of time. Thus, the annoying sound due to noise is not supplied to the audio signal output terminal.

With the AM radio receiver according to this embodiment as described above, by halting the second noise detector 13 during the period in which the first noise detector 12 detects and eliminates noise, unnecessary distortion of the output signal caused by redundant operations is avoided. Moreover, by utilizing the characteristics described above, noise contained in the second intermediate-frequency signal that was not detected by the first noise detector 12 is detected by the second noise detector 13, so that by halting the intermediate-frequency amplifier 14 for a certain period of time, noise can be detected and eliminated appropriately.

Embodiment 2

Figure 7:
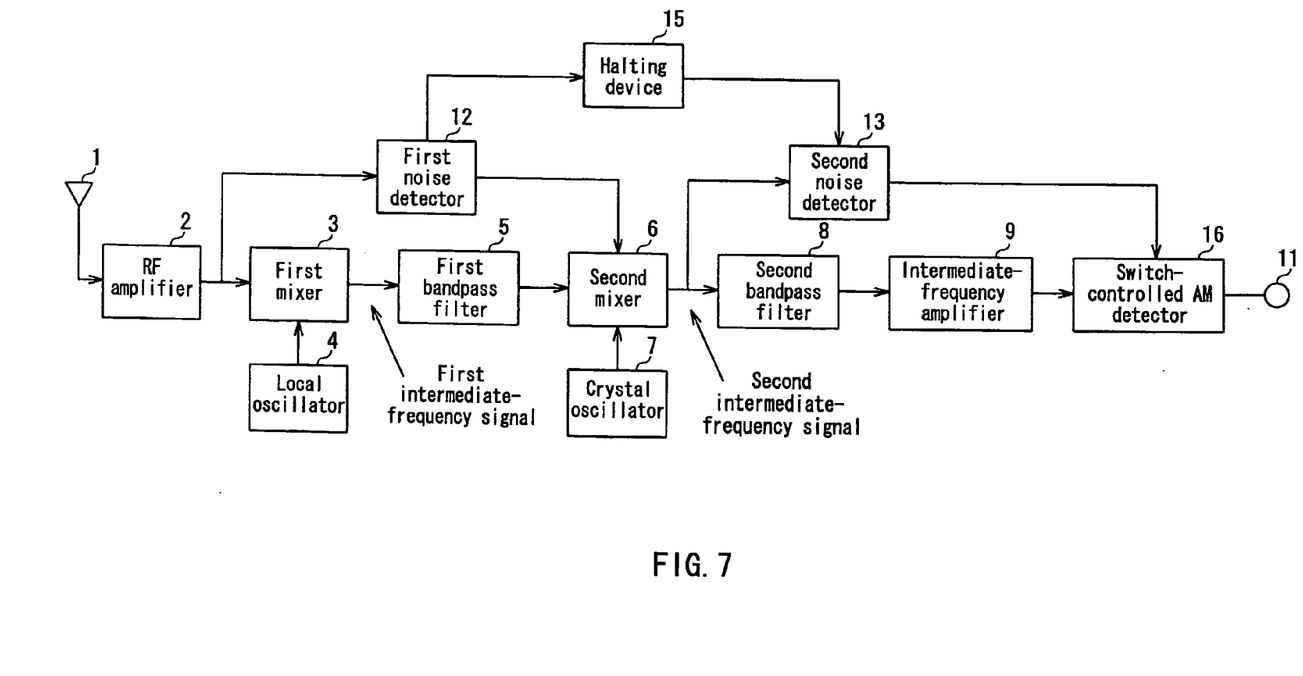
FIG. 7 is a block diagram of an AM radio receiver according to Embodiment 2 of the present invention.

FIG. 7 is a block diagram showing the configuration of an AM radio receiver according to Embodiment 2 of the present invention. Elements that are the same as in Embodiment 1 shown in FIG. 1 are described using the same reference symbols.

In this embodiment, the switch-controlled intermediate-frequency amplifier 14 of FIG. 1 is replaced with an intermediate-frequency amplifier 9 like that of the conventional example, and the AM detector 10 is replaced with a switch-controlled AM detector 16. Moreover, the second noise detector 13 is connected to the switch-controlled AM detector 16.

The configuration and operation of the first noise detector 12, halting device 15 and second noise detector 13 are the same as in Embodiment 1 illustrated in FIG. 2, FIG. 4 and FIG. 5.

An operation of the AM radio receiver configured as described above is described in the following. In FIG. 7, a radio station signal received by antenna 1 is amplified by the RF amplifier 2, and mixed in the first mixer 3 with a local oscillation signal from the local oscillator 4 so as to be converted to a first intermediate-frequency signal. The first intermediate-frequency signal is band-limited by the first bandpass filter 5, and mixed in the second mixer 6 with a crystal oscillation signal from the crystal oscillator 7 so as to be converted to a second intermediate-frequency signal. The second intermediate-frequency signal is band-limited by the second bandpass filter 8, amplified by the intermediate-frequency amplifier 9, and then AM-demodulated in the switch-controlled AM detector 16 to be output.

On the other hand, upon detecting ambient noise present in the radio station signal from the output signal of the RF amplifier 2, the first noise detector 12 halts the second mixer 6 for a certain period of time. In addition, upon detecting noise from the output of the second mixer 6, the second noise detector 13 halts the switch-controlled AM detector 16 for a certain period of time. The operation of the first noise detector 12, second noise detector 13 and halting device 15 are the same as in Embodiment 1, so that an explanation thereof is omitted here.

Figure 8:
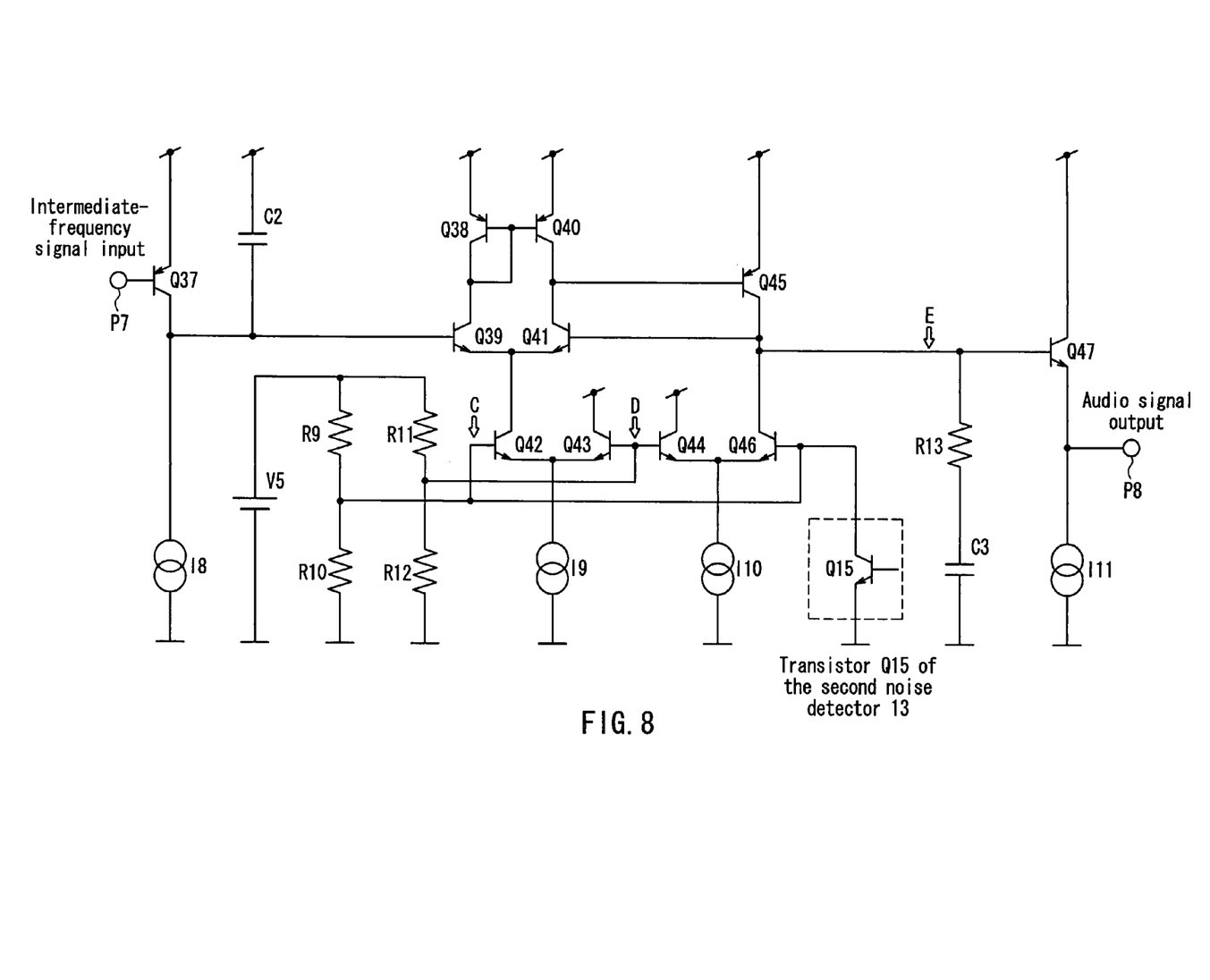
FIG. 8 is a circuit diagram showing an example of the configuration of a switch-controlled AM detector in the same AM radio receiver.

FIG. 8 illustrates an example of the configuration of the switch-controlled AM detector 16. This switch-controlled AM detector 16 is composed of resistors $R_9$-$R_{13}$, transistors $Q_{37}$-$Q_{47}$, a constant-voltage supply $V_5$ and constant-current supplies $I_8$-$I_{11}$.

The intermediate-frequency signal from the intermediate-frequency amplifier 9 is supplied to input terminal $P_7$ of FIG. 8, and the AM-detected audio signal is provided as output from an output terminal $P_8$ (the same as AM detector output terminal 11). The transistor $Q_{15}$ of the second noise detector 13 is connected to the base of the transistor $Q_{46}$ making up the buffer circuit, so that when transistor $Q_{15}$ is ON, transistor $Q_{46}$ is OFF.

The circuit of FIG. 8 is set up such that the relationships $R_{10}>R_9$ and $R_{11}=R_{12}$ are satisfied. Accordingly, if the transistor $Q_{15}$ of the second noise detector 13 is OFF, then the potential of a node C is higher than the potential of a node D, and thus capacitor $C_2$ serves as an envelope detector for the intermediate-frequency signal applied to the input terminal $P_7$, which passes through the buffer circuit and is supplied to the output terminal $P_8$.

When the transistor $Q_{15}$ of the second noise detector 13 turns ON, the buffer circuit does not operate and a node E assumes the high impedance state, so that the signal held by the capacitor $C_3$ is supplied to the output terminal $P_8$.

The following is a description of an operation when ambient noise from the antenna is present in the radio station signal in the AM radio receiver of this embodiment.

When ambient noise from the antenna is detected by the first noise detector 12 from the output signal of the RF amplifier 2, the first noise detector 12 halts the second mixer 6, and during the period in which noise is eliminated by the first noise detector 12, the second noise detector 13 is halted by the halting device 15. Accordingly, the operation of eliminating noise is performed only by the first noise detector 12.

On the other hand, when ambient noise from the antenna is not detected by the first noise detector 12 due to the effect of the interfering station signal, noise will be present in the output of the second mixer 6. However, the received signal is band limited by the first bandpass filter 5, so that the interfering station signal will be attenuated, and thus the second noise detector 13 is capable of performing pulse noise detection appropriately without a decrease in its detection sensitivity. The switch-controlled AM detector 16 holds the signal for a certain period of time only when noise is detected by the second noise detector 13. As a result, the annoying sound due to noise is not supplied to the output terminal $P_8$.

With the AM radio receiver according to this embodiment as described above, by halting the second noise detector 13 during the period in which the first noise detector 12 detects and eliminates noise, unnecessary distortion of the output signal caused by redundant operations is avoided. Moreover, when noise contained in the second intermediate-frequency signal that was not detected by the first noise detector 12 is detected by the second noise detector 13, detection and elimination of the noise can be performed appropriately by holding the AM detector output signal for a certain period of time.

What is claimed is:

1. An AM radio receiver comprising:
   an RF amplifier that amplifies a received radio station signal,
   a first mixer that mixes a RF signal supplied from the RF amplifier with a local oscillation signal from a local oscillator thus converting it to a first intermediate-frequency signal,
   a first bandpass filter that band-limits the first intermediate-frequency signal,
   a second mixer that mixes an output signal from the first bandpass filter with a crystal oscillation signal from a crystal oscillator, thus converting it to a second intermediate-frequency signal,
   a second bandpass filter that band-limits the second intermediate-frequency signal, an intermediate-frequency amplifier that amplifies an output signal from the second bandpass filter, an AM detector that AM-demodulates an output signal from the intermediate-frequency amplifier and provides output of an audio signal, and a noise detector for detecting and eliminating ambient noise present in the received radio station signal, wherein:

the noise detector comprises a first noise detector that detects noise from the RF signal and eliminates that noise from the first intermediate-frequency signal, and a second noise detector that detects noise from the second intermediate-frequency signal and eliminates that noise from the second intermediate-frequency signal, and the AM radio receiver further comprises a halting device that halts the second noise detector for a predetermined period of time when the first noise detector has detected noise.

2. The AM radio receiver according to claim 1 wherein, upon detecting the noise, the second noise detector provide output of a detection signal and the detection signal is supplied to the intermediate-frequency amplifier for a predetermined period of time, and the intermediate-frequency amplifier comprises a noise elimination section that eliminates noise contained in the intermediate-frequency signal depending on the detection signal.

3. The AM radio receiver according to claim 2, wherein the noise elimination section halts the output of the intermediate-frequency amplifier during the period in which the detection signal is supplied.

4. An AM radio receiver comprising:

an RF amplifier that amplifies a received radio station signal, a first mixer that mixes a RF signal supplied from the RF amplifier with a local oscillation signal from a local oscillator, thus converting it to a first intermediate-frequency signal, a first bandpass filter that band-limits the first intermediate-frequency signal, a second mixer that mixes an output signal from the first bandpass filter with a crystal oscillation signal from a crystal oscillator, thus converting it to a second intermediate-frequency signal, a second bandpass filter that band-limits the second intermediate-frequency signal, an intermediate-frequency amplifier that amplifies an output signal from the second bandpass filter, an AM detector that AM-demodulates an output signal from the intermediate-frequency amplifier and provides output of an audio signal, and a noise detector for detecting and eliminating ambient noise present in the received radio station signal, wherein:

the noise detector comprises a first noise detector that detects noise from the RF signal and eliminates that noise from the first intermediate-frequency signal, and a second noise detector that detects noise from the second intermediate-frequency signal and eliminates that noise from the audio signal, and the AM radio receiver further comprises a halting device that halts the second noise detector for a predetermined period of time when the first noise detector has detected noise.

5. The AM radio receiver according to claim 4 wherein, upon detecting the noise, the second noise detector provides output of a detection signal and the detection signal is supplied to the AM detector for a predetermined period of time, and the AM detector comprises a noise elimination section that eliminates noise contained in the audio signal depending on the detection signal.

6. The AM radio receiver according to claim 5, wherein the noise elimination section causes the output signal of the AM detector to be held during the period in which the detection signal is supplied.

* * * * *